United States Patent [19]

Griffin

[11] Patent Number: 4,574,899
[45] Date of Patent: Mar. 11, 1986

[54] COMPENSATED MULTI-LOAD CELL SCALE

[75] Inventor: Neil C. Griffin, Columbus, Ohio

[73] Assignee: Reliance Electric Company, Cleveland, Ohio

[21] Appl. No.: 659,851

[22] Filed: Oct. 10, 1984

Related U.S. Application Data

[63] Continuation of Ser. No. 408,830, Aug. 17, 1982, abandoned.

[51] Int. Cl.⁴ .......................... G01G 9/00; G01G 3/14
[52] U.S. Cl. ......................................... 177/211; 177/1; 73/862.67
[58] Field of Search ................... 177/211, 1; 73/862.67

[56] References Cited

U.S. PATENT DOCUMENTS

| | | | |
|---|---|---|---|
| 3,576,128 | 4/1971 | Lockery | 73/862.67 |
| 3,968,683 | 7/1976 | Ormond | 177/211 X |
| 4,261,195 | 4/1981 | Lockery | 177/211 X |

OTHER PUBLICATIONS

Lockery, Harry E., "Low Profile Weighing Transducers", *Weighing and Measurement*, Jan.-Feb. 1984, pp. 13-17.

*Primary Examiner*—E. A. Goldberg
*Assistant Examiner*—Patrick W. Foster
*Attorney, Agent, or Firm*—Roy F. Hollander

[57] ABSTRACT

The present invention relates to an improved scale arrangement comprising three or more load cells which are compensated for both lateral and longitudinal displacement of the load on the scale platter or platform and to a method of accurately compensating the scale so that the output of the scale is independent of the position of the weight on the scale. Only two strain gages are provided for each load cell which gages are connected in a single bridge circuit. Compensating resistor networks are connected to at least certain of the strain gages.

22 Claims, 13 Drawing Figures

COMPENSATED MULTI-LOAD CELL SCALE

This application is a continuation of application Ser. No. 408,830, filed Aug. 17, 1982, now abandoned.

BACKGROUND OF THE INVENTION

The present invention relates to an improved scale arrangement comprising three or more load cells which are compensated for both lateral and longitudinal displacement of the load on the scale platter or platform and to a method of accurately compensating the scale so that the output of the scale is independent of the position of the weight on the scale.

U.S. Pat. No. 3,576,128 granted Apr. 27, 1971 to Lockery discloses a dual beam load cell compensated for longitudinal displacement of the load. Copending application of Griffen, Ser. No. 272,928 filed June 12, 1981, now U.S. Pat. No. 4,380,175 issued Apr. 19, 1983, discloses an improved compensating arrangement for a dual beam load cell. U.S. Pat. No. 4,282,748 granted Aug. 11, 1981 to Lockery et al relates to a single beam load cell wherein the radius of the fillet between the load section and the mounting section is adjusted so that a load cell becomes substantially insensitive to inboard-outboard loading. Such adjustments are difficult to make and time consuming. Another compensated single beam load cell arrangement is disclosed in copending application of Griffen et al, Ser. No. 358,195 filed Mar. 15, 1982, now U.S. Pat. No. 4,453,609 issued, June 12, 1984. U.S. Pat. No. 2,499,033 granted Feb. 28, 1950 to Oberholtzer; U.S. Pat. No. 4,261,195 granted Apr. 14, 1981 to Lockery; and U.S. Pat. No. 4,261,429 granted Apr. 14, 1981 to Lockery are also of interest.

SUMMARY OF THE INVENTION

The above compensated scale arrangements are limited to one or at most two load cells and thus are limited to relatively small capacity scales. Also, the load cells of the above scale arrangements employ four strain gages per load cell. In accordance with the present invention, three or more load cells incorporated in a scale arrangement are compensated for both longitudinal and lateral displacement of the load. In addition, it has been discovered that with three or more load cells per scale only two strain gages need be provided for each of the load cells. In addition, the strain gages on the load cells are connected in one of several electrical bridge circuits or arrangements and compensating resistor networks connected either in parallel with respective ones of the load cells or in series with respective ones of the load cells. In addition, a novel bridge circuit arrangement is disclosed wherein a minimum number of compensating resistors are interconnected with various ones of the strain gages. In addition, various arrangements and methods have been devised and described for rapidly calculating the magnitude of the various compensating resistor networks. As described herein, a number of different types of load cells may be employed with satisfactory compensating results. The scale mechanism including the platter or platform may be supported on the load cells in any one of a number of known methods including the "gage plate" arrangement shown in U.S. Pat. No. 4,261,429 to Lockery.

BRIEF DESCRIPTION OF THE DRAWINGS

FIG. 12 shows a bridge circuit similar to the arrangement of FIG. 11 for interconnecting the strain gages of the load cells in a different manner.

GENERAL DESCRIPTION

Figure 1:
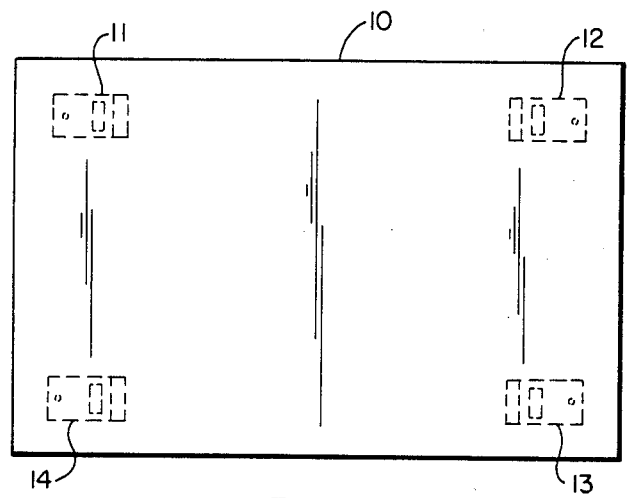
FIG. 1 shows a plan view of an exemplary scale arrangement in accordance with the present invention embodying four load cells.
Figure 2:
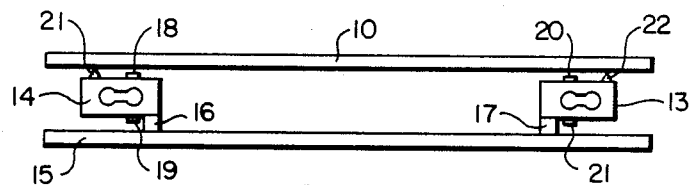
FIG. 2 shows a side view of the exemplary scale in accordance with the present invention shown in FIG. 1.

FIGS. 1 and 2 show an exemplary embodiment of the present invention incorporating four load cells. The scale platter 10 is supported by four load cells 11, 12, 13 and 14. These load cells are arranged at or near the corners of the platter 10 as shown.

As shown in FIG. 2, the load cells are supported on a base 15 by supports 16 and 17. The particular load cells shown are of a conventional dual beam type but, as shown in FIG. 2, each load cell has only one strain gage on each beam instead of two as the conventional dual beam load cell. These strain gages are shown at 18, 19, 20 and 21.

Figure 3:
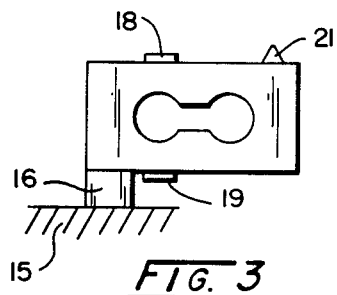
FIG. 3 shows in greater detail one of the load cells suitable for use in the exemplary scale of FIGS. 1 and 2.

The platter is supported at the positions indicated by the support structures 21 and 22. The load cells of FIGS. 1 and 2 are shown in greater detail in FIG. 3. As shown in FIG. 3, a dual beam load cell is supported on base 15 by support 16. This load cell is provided with only two strain gages 18 and 19 and a support structure 21. The structure 21 is shown as a cone defining a bearing point between the load cell and the platter. The invention is not limited, however, to such a structure but may include any of the various conventional types of weight bearing structures to transmit the load substantially vertical from the platter to the load cell. Such structures include ball bearings and various forms of pins or other types of structures which reduce or eliminate the effect of lateral forces.

Figure 4:
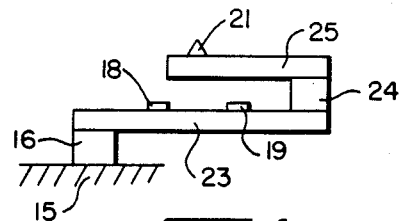
FIG. 4 shows another moment insensitive load cell suitable for use in the exemplary scales shown in FIGS. 1 and 2.

The invention is not limited to scale arrangements employing only dual beam load cells but may also employ other conventional types of load cells such as the single beam load cell shown in FIG. 4. Here the single beam 23 is supported by support 16 on base 15. This single beam load cell is provided with two strain gages 18 and 19 instead of four as in a conventional single beam load cell. While moment insensitive loading is not essential or required in any of the load cells employed in accordance with the present invention, such arrangement is shown in FIG. 4 which comprises a member 25 supported on the load cell by support member 24. The member 25 is provided so that the support point 21 will be between the strain gages 18 and 19. This arrangement renders the load cell structure insensitive to bending moments applied to the load cell beam structure. As indicated above, similar moment insensitive arrangements may be applied to the dual beam load cell of FIG. 3 as well as to the load cell arrangement of FIG. 5.

Figure 5:
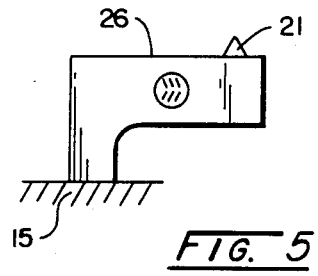
FIG. 5 shows a shear type load cell suitable for use in the scale arrangement of FIGS. 1 and 2.

FIG. 5 shows a conventional shear beam load cell supported on support 15. The shear beam 26 has a load bearing point 21 which may be of any suitable structure similar to the load supporting structures 21 of FIGS. 3 and 4. The shear beam structure 26 of FIG. 5 may be employed in the scale arrangements shown in FIGS. 1 and 2 in place of the dual shear beam shown in FIG. 3 or the single beam load cell shown in FIG. 4.

Figure 6:
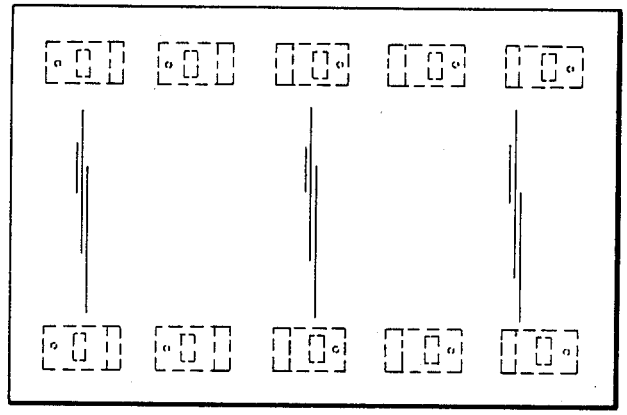
FIG. 6 shows another exemplary embodiment of the invention employing 10 load cells.

FIG. 6 shows a plan view of a much larger scale arrangement which embodies 10 load cells which may be of the type shown in FIGS. 3, 4 or 5. Such a scale arrangement may be advantageously employed on occasion for truck scales, railroad car scales, bus scales and the like.

A feature of the present invention relates to adjusting the various load cells so that the output of the combined number of load cells is substantially independent of the exact position of the load or weight placed on the scale platter or platform.

If all of the load cells of a given scale could be made identical, mounted identical, and if the scale platform or platter or load structure could be made uniform throughout its structure, then the combined output of the load cells theoretically should be independent of the position of a weight or load on the scale platter or platform. However, these conditions are very difficult to obtain in practice and very expensive.

Some of the factors which tend to cause the combined output of the load cells to vary by a small amount depending upon the position of the load or weight on the scale platter or platform include some of the following: (1) small variations in the positioning of the load cells; (2) small variations in the structure of the scale platform or platter; (3) small variations in the composition of different portions of the scale platform or platter; (4) small variations in the flexure pattern of the platter or platform.

Figure 7:
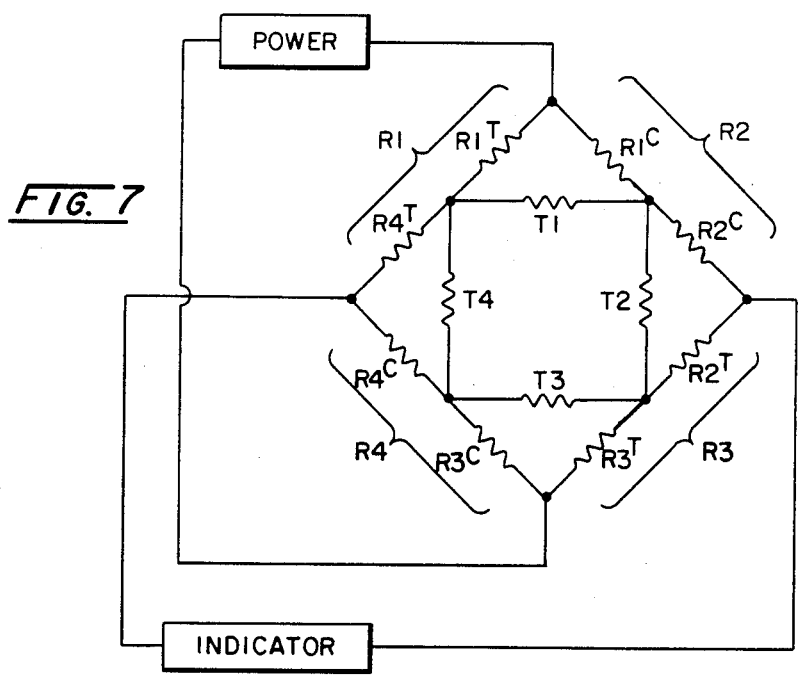
FIG. 7 shows one form of a bridge circuit for interconnecting the strain gages on the load cells.

As indicated above, in accordance with the present invention when the scale platform or platter is supported on a plurality of load cells greater than two, only two strain gages, one subject to tension and the other subject to compression, are required on each of the load cells. These strain gages are connected in an electrical bridge circuit arrangement in which the strain gages on any one load cell are connected in adjacent arms of the electrical bridge. FIG. 7 shows a novel bridge circuit arrangement in which a single compensating resistor may be connected around the strain gages on the respective load cells. With the bridge circuit arrangement of FIG. 7 the coupling between all four load cells and between the elements of the bridge circuit may be compensated.

After the scale has been constructed and assembled as described above, but with the compensating resistors disconnected, one pair of the bridge terminals is connected to the power source and the other pair of bridge terminals connected to the indicator. The indicator may be calibrated in any described units, but for convenience the units will be referred to herein as "counts".

After the bridge circuit has been connected as described above, a test weight is then placed on the scale platform or platter. The test weight is first placed on the platter over one of the load cells and the output of the indicator noted. The test weight is then moved to and placed over another of the load cells. The output is again noted. This procedure is then repeated. Thus, for the exemplary scale shown in FIGS. 1 and 2, the test weight is placed at or near the four corners over or near the four load cells.

Next it is desired to compute the proper compensating resistance or resistance networks to be connected to the strain gages of the various load cells. The computations to be performed vary with the different electrical bridge circuits which may be employed in combination with the load cells of any given scale. Assume first that the scale to be tested has an electrical bridge circuit in accordance with FIG. 7.

In order to determine the desired compensating resistors to be connected to the strain gages of the various load cells, it is desirable to first develop a program or method of procedure to compute the various resistor values.

The general expression for the output of a strain gage bridge is $$DE/V = \tfrac{1}{4}\{(DR1/R1) - (DR2/R2) + (DR3/R3) - (DR4/R4)\} \quad (1)$$

Here the R refers to the resistance of the arm of the bridge and DR refers to the change in resistance of that arm. There are four arms so the R's are labeled R1 through R4. By convention R1 and R3 usually refer to tension gages or resistances that increase with load on the scale or span. R2 and R4 usually refer to compression gages or resistances that decrease with span. DE/V is the output or change in output of the bridge in response to a load or weight placed on the scale. This output may be in any suitable units designated as counts herein.

As indicated above, a single compensating resistor is provided for the strain gages of each of the load cells in the bridge circuit arrangement of FIG. 7. This circuit arrangement may be transformed into an equivalent conventional bridge circuit arrangement by changing the three "delta" connected resistors at each corner into the equivalent "star" or "Y" circuit arrangement. (See *Introductory Circuit Analysis*, 3rd Edition, by Boylestad published by Charles E. Merrill Publishing Co. of Columbus, Toronto, London, Sydney, pages 150-156.)

Thus, the equivalent ER1, ER2, ER3, and ER4 are as follows:

$$ER1 = \frac{(T1)(R1^T)}{T1 + R1^T + R1^C} + \frac{(T4)(R4^T)}{T4 + R4^T + R4^C} \quad (2)$$

$$ER2 = \frac{(T2)(R2^C)}{T2 + R2^C + R2^T} + \frac{(T1)(R1^C)}{T1 + R1^C + R1^T}$$

-continued $$ER3 = \frac{(T3)(R3^T)}{R3^C + R3^T + T3} + \frac{(T2)(R2^T)}{R2^T + R2^C + T2}$$

$$ER4 = \frac{(T3)(R3^C)}{T3 + R3^C + R3^T} + \frac{(T4)(R4^C)}{T4 + R4^C + R4^T}$$

where $R1^T$, $R2^T$, $R3^T$, and $R4^T$ are the resistances of the strain gages in tension in the respective load cells 1, 2, 3, and 4. $R1^C$, $R2^C$, $R3^C$, and $R4^C$ are the resistances of the strain gages in compression on the respective load cells.

The change in equivalent resistance due to weight placed on the scale becomes $$EDR1 \cong \frac{(T1)(DR1^T)}{T1 + R1^T + R1^C} + \frac{(T4)(DR4^T)}{T4 + R4^T + R4^C} \quad (3)$$

$$EDR2 \cong \frac{(T2)(DR2^C)}{T2 + R2^T + R2^C} + \frac{(T1)(DR1^C)}{T1 + R1^T + R1^C}$$

$$EDR3 \cong \frac{(T3)(DR3^T)}{T3 + R3^T + R3^C} + \frac{(T2)(DR2^T)}{T2 + R2^T + R2^C}$$

$$EDR4 \cong \frac{(T3)(DR3^C)}{T3 + R3^T + R3^C} + \frac{(T4)(DR4^C)}{T4 + R4^T + R4^C}$$

Now assume that $DR^T = -DR^C = DR$, $G = R^T = R^C$, and $R^T + R^C$ is substantially constant and equal to $2G$. This allows the general expression to be written as $$\frac{DE}{V} = \frac{1}{4} \left\{ \frac{\frac{(T1)(DR1^T)}{T1 + 2G} + \frac{(T4)(DR4^T)}{T4 + 2G}}{\frac{(T1)(R1^T)}{T1 + 2G} + \frac{(T4)(R4^T)}{T4 + 2G}} - \right. \quad (4)$$

$$\frac{\frac{(T2)(DR2^C)}{T2 + 2G} + \frac{(T1)(DR1^C)}{T1 + 2G}}{\frac{(T2)(R2^C)}{T2 + 2G} + \frac{(T1)(R1^C)}{T1 + 2G}} +$$

$$\frac{\frac{(T3)(DR3^T)}{T3 + 2G} + \frac{(T2)(DR2^T)}{T2 + 2G}}{\frac{(T3)(R3^T)}{T3 + 2G} + \frac{(T2)(R2^T)}{T2 + 2G}} -$$

$$\left. \frac{\frac{(T3)(DR3^C)}{T3 + 2G} + \frac{(T4)(DR4^C)}{T4 + 2G}}{\frac{(T3)(R3^C)}{T3 + 2G} + \frac{(T4)(R4^C)}{T4 + 2G}} \right\}$$

Now the effect of the compensating resistors T1, T2, T3, and T4 is to reduce or attenuate the output of the respective load cell. Thus, assume an attenuation factor A such that $$A = \frac{T}{T + 2G}.$$

Since the output of each load cell is slightly different and it is desired to individually adjust the output, an attenuation factor for each load cell A1, A2, A3, and A4 is assumed.

Substituting $$A = \frac{T}{T + 2G}$$

the general equation becomes $$\frac{DE}{V} = \frac{1}{4} \left\{ \frac{(A1)(DR1^T) + (A4)(DR4^T)}{(A1)(R1^T) + (A4)(R4^T)} + \right. \quad (5)$$

$$\frac{(A2)(DR2^C) + (A1)(DR1^C)}{(A2)(R2^C) + (A1)(R1^C)} +$$

$$\frac{(A3)(DR3^T) + (A2)(DR2^T)}{(A3)(R3^T) + (A2)(R2^T)} +$$

$$\left. \frac{(A3)(DR3^C) + (A4)(DR4^C)}{(A3)(R3^C) + (A4)(R4^C)} \right\}$$

which can be written as $$\frac{DE}{V} = \frac{1}{4G} \left\{ (DR1) \left( \frac{A1}{A1 + A2} + \frac{A1}{A1 + A4} \right) + \right. \quad (6)$$

$$(DR2) \left( \frac{A2}{A2 + A3} + \frac{A2}{A2 + A1} \right) +$$

$$(DR3) \left( \frac{A3}{A3 + A4} + \frac{A3}{A3 + A2} \right) +$$

$$\left. (DR4) \left( \frac{A4}{A4 + A1} + \frac{A4}{A4 + A3} \right) \right\}$$

When the test weight is placed on the scale over the first load cell, the contribution of the other load cells is so small in comparison to the output of the No. 1 load cell that such contributions may be ignored. Thus, the above equation becomes $$\frac{DE1}{V} \cong \frac{(DR1)}{4G} \left( \frac{A1}{A1 + A2} + \frac{A1}{A1 + A4} \right) \quad (7)$$

Similarly, when the test weight is placed in succession over the No. 2, 3, and 4 load cells, the above equation becomes, respectively, $$\frac{DE2}{V} \cong \frac{(DR2)}{4G} \left( \frac{A2}{A2 + A3} + \frac{A2}{A2 + A1} \right) \quad (8)$$

$$\frac{DE3}{V} \cong \frac{(DR3)}{4G} \left( \frac{A3}{A3 + A4} + \frac{A3}{A3 + A2} \right) \quad (9)$$

$$\frac{DE4}{V} \cong \frac{(DR4)}{4G} \left( \frac{A4}{A4 + A1} + \frac{A4}{A4 + A3} \right) \quad (10)$$

Also, as pointed out above, the output DE/V is called a "Span". In addition, initially the A's are all 1 so the above equations become, respectively, $$\text{Span } 1 = \frac{DR1}{4G} \text{ or } DR1 = 4G\text{Span } 1 \quad (11)$$

$$\text{Span } 2 = \frac{DR2}{4G} \text{ or } DR2 = 4G\text{Span } 2$$

$$\text{Span } 3 = \frac{DR3}{4G} \text{ or } DR3 = 4G\text{Span } 3$$

$$\text{Span } 4 = \frac{DR4}{4G} \text{ or } DR4 = 4G \text{Span } 4$$

Next, a series of iterative computations are performed in accordance with the following equations in which the above equivalents are substituted.

$$\text{SPAN } 1_N = \text{SPAN } 1_0 \left( \frac{A1}{A1+A2} + \frac{A1}{A1+A4} \right)_N \quad (10)$$

$$\text{SPAN } 2_N = \text{SPAN } 2_0 \left( \frac{A2}{A2+A3} + \frac{A2}{A2+A1} \right)_N$$

$$\text{SPAN } 3_N = \text{SPAN } 3_0 \left( \frac{A3}{A3+A4} + \frac{A3}{A3+A2} \right)_N$$

$$\text{SPAN } 4_N = \text{SPAN } 4_0 \left( \frac{A4}{A4+A1} + \frac{A4}{A4+A3} \right)_N \quad (20)$$

where Span $1_0$, Span $2_0$, Span $3_0$, and Span $4_0$ are the values obtained with the test weight over the respective load cells.

For the first computation, the A for the highest Span is decremented a small fraction, 0.01 for example, and then all the Spans computed with this decremented A and all the other A's still at 1.

For the next computation, the same A is decremented another 0.01, for example, and all the Spans again computed. This process is then repeated until a value of the highest Span is reduced below the value of the next highest Span. Then the A for the new highest Span is decremented for each of the succeeding computations until the next highest Span is reached. The process is repeated until such time as all of the Spans are substantially equal. At this time, the iterative computations are terminated and the value of the respective compensating resistors determined from the equation $$A = \frac{T}{T+2G}$$

The following table shows the results of a complete series of iterative computations required to determine the value of the required compensating resistors.

| SPAN1 | SPAN2 | SPAN3 | SPAN4 | A1 | A2 | A3 |
|---|---|---|---|---|---|---|
| 2002 | 2100 | 2047 | 1951 | 1 | 1 | 1 |
| SPAN1 | SPAN2 | SPAN3 | SPAN4 | A1 | A2 | A3 |
| 2007.03 | 2089.45 | 2052.14 | 1951 | 1 | .99 | 1 |
| SPAN1 | SPAN2 | SPAN3 | SPAN4 | A1 | A2 | A3 |
| 2012.11 | 2078.79 | 2057.34 | 1951 | 1 | .98 | 1 |
| SPAN1 | SPAN2 | SPAN3 | SPAN4 | A1 | A2 | A3 |
| 2017.24 | 2068.02 | 2062.59 | 1951 | 1 | .97 | 1 |
| SPAN1 | SPAN2 | SPAN3 | SPAN4 | A1 | A2 | A3 |
| 2022.43 | 2057.14 | 2067.89 | 1951 | 1 | .96 | 1 |
| SPAN1 | SPAN2 | SPAN3 | SPAN4 | A1 | A2 | A3 |
| 2022.43 | 2062.42 | 2057.6 | 1955.9 | 1 | .96 | .99 |
| SPAN1 | SPAN2 | SPAN3 | SPAN4 | A1 | A2 | A3 |
| 2027.67 | 2051.43 | 2062.96 | 1955.9 | 1 | .95 | .99 |
| SPAN1 | SPAN2 | SPAN3 | SPAN4 | A1 | A2 | A3 |
| 2027.67 | 2056.76 | 2052.57 | 1960.85 | 1 | .95 | .98 |
| SPAN1 | SPAN2 | SPAN3 | SPAN4 | A1 | A2 | A3 |
| 2032.96 | 2045.65 | 2057.98 | 1960.85 | 1 | .94 | .98 |
| SPAN1 | SPAN2 | SPAN3 | SPAN4 | A1 | A2 | A3 |
| 2032.96 | 2051.03 | 2047.49 | 1965.86 | 1 | .94 | .97 |
| SPAN1 | SPAN2 | SPAN3 | SPAN4 | A1 | A2 | A3 |
| 2038.31 | 2039.81 | 2052.96 | 1965.86 | 1 | .93 | .97 |
| SPAN1 | SPAN2 | SPAN3 | SPAN4 | A1 | A2 | A3 |
| 2038.31 | 2045.25 | 2042.36 | 1970.91 | 1 | .93 | .96 |
| SPAN1 | SPAN2 | SPAN3 | SPAN4 | A1 | A2 | A3 |
| 2043.71 | 2033.91 | 2047.89 | 1970.91 | 1 | .92 | .96 |
| SPAN1 | SPAN2 | SPAN3 | SPAN4 | A1 | A2 | A3 |
| 2043.71 | 2039.41 | 2037.18 | 1976.01 | 1 | .92 | .95 |
| SPAN1 | SPAN2 | SPAN3 | SPAN4 | A1 | A2 | A3 |
| 2039.12 | 2033.21 | 2042.77 | 1980.91 | .99 | .91 | .95 |
| SPAN1 | SPAN2 | SPAN3 | SPAN4 | A1 | A2 | A3 |
| 2039.12 | 2038.76 | 2031.94 | 1986.07 | .99 | .91 | .94 |
| SPAN1 | SPAN2 | SPAN3 | SPAN4 | A1 | A2 | A3 |
| 2034.48 | 2032.49 | 2037.6 | 1991.02 | .98 | .9 | .94 |
| SPAN1 | SPAN2 | SPAN3 | SPAN4 | A1 | A2 | A3 |
| 2034.48 | 2038.11 | 2026.66 | 1996.23 | .98 | .9 | .93 |
| SPAN1 | SPAN2 | SPAN3 | SPAN4 | A1 | A2 | A3 |
| 2029.81 | 2031.76 | 2032.37 | 2001.24 | .97 | .89 | .93 |
| SPAN1 | SPAN2 | SPAN3 | SPAN4 | A1 | A2 | A3 |
| 2029.81 | 2037.44 | 2021.32 | 2006.5 | .97 | .89 | .92 |
| SPAN1 | SPAN2 | SPAN3 | SPAN4 | A1 | A2 | A3 |
| 2025.09 | 2031.01 | 2027.1 | 2011.55 | .96 | .88 | .92 |
| SPAN1 | SPAN2 | SPAN3 | SPAN4 | A1 | A2 | A3 |
| 2030.8 | 2019.03 | 2032.94 | 2011.55 | .96 | .87 | .92 |
| SPAN1 | SPAN2 | SPAN3 | SPAN4 | A1 | A2 | A3 |
| 2030.8 | 2024.77 | 2021.77 | 2016.87 | .96 | .87 | .91 |

$T1 = 16,800$ ohms
$T2 = 4,685$ ohms
$T3 = 7,078$ ohms
$T4 = \infty$

The accuracy of the compensation is determined in part by size of the decrement of the A's employed in the iterative computations. In addition, when desired or required additional series of iterative computations may be performed using the results of the previous series as the beginning or Span for the next series of computations.

Figure 8:
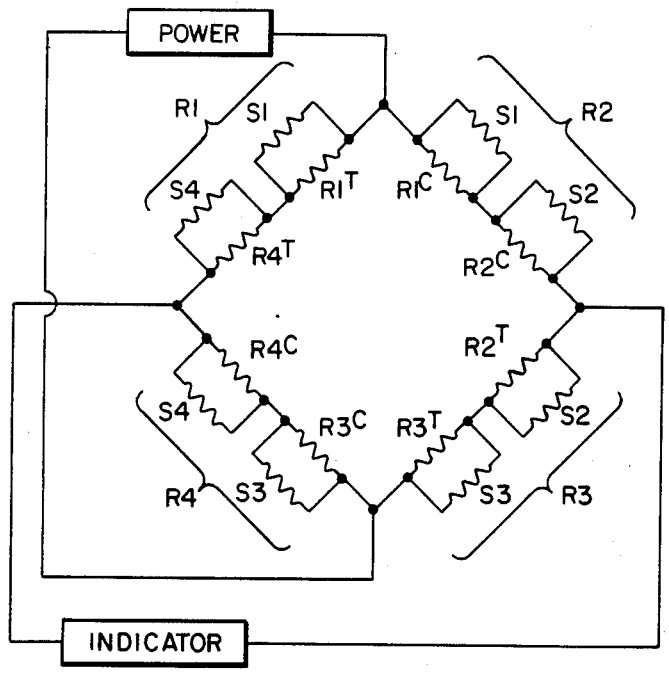
FIG. 8 shows another form of a bridge circuit also suitable for interconnecting the strain gages of the load cells in which the compensating resistors are connected in parallel with the strain gages.

When it is desirable to provide a compensating resistor for each strain gage, the bridge circuit in accordance with FIG. 8 may be employed. This arrangement is suitable for scales employing three or more load cells. Here the compensating resistor networks are connected in parallel with the strain gages.

As stated above, the general equation for the output of a strain gage bridge is $$\frac{DE}{V} = \frac{1}{4} \left( \frac{DR1}{R1} - \frac{DR2}{R2} + \frac{DR3}{R3} - \frac{DR4}{R4} \right) \quad (1)$$

With reference to FIG. 8, the expressions for the R's are $$R1 = \frac{R1^T(S1)}{R1^T + S1} + \frac{R4^T(S4)}{R4^T + S4} \quad (13)$$

$$R2 = \frac{R2^T(S2)}{R2^T + S2} + \frac{R1^T(S1)}{R1^T + S1}$$

$$R3 = \frac{R2^T(S2)}{R2^T + S2} + \frac{R3^T(S3)}{R3^T + S3}$$

$$R4 = \frac{R3^T(S3)}{R3^T + S3} + \frac{R4^T(S4)}{R4^T + S4}$$

Now assume that $R^T = R^C = G$. Also assume that $$A = \frac{S}{S+G}.$$

The R's can be written as $$R1 = (A1 + A4)G$$
$$R2 = (A1 + A2)G$$
$$R3 = (A2 + A3)G$$
$$R4 = (A3 + A4)G$$

The expression for DR is $$DR = \frac{DR1^T(S1)(R1 + S1) - DR1^T(S1)(R1)}{(R1 + S1)^2}$$

$$DR = \left(\frac{S}{S + G}\right)^2 dR = A^2 dR$$

where dR is the change in gage resistance due to strain. Using this and the approximation $dR^T = -dR^C = dR$, the expression for the output can be written as $$\frac{DE}{V} = \frac{1}{4}\left\{\frac{(A1)^2(dR1) + (A4)^2(dR4)}{(A1)G + (A4)G} + \right.$$

$$\frac{(A1)^2(dR1) + (A2)^2(dR2)}{(A1)G + (A2)G} + \frac{(A2)^2(dR2) + (A3)^2(dR3)}{(A2)G + (A3)G} +$$

$$\left.\frac{(A3)^2(dR3) + (A4)^2(dR4)}{(A3)G + (A4)G}\right\}$$

Rearranging the terms $$\frac{DE}{V} = \frac{1}{4G}\left\{DR1\frac{(A1)^2}{A1 + A2} + \frac{(A1)^2}{A1 + A4} + \right. \tag{14}$$

$$DR2\frac{(A2)^2}{A2 + A3} + \frac{(A2)^2}{A2 + A1} + DR3\frac{(A3)^2}{A3 + A4} + \frac{(A3)^2}{A3 + A2} +$$

$$\left.DR4\frac{(A4)^2}{A4 + A1} + \frac{(A4)^2}{A4 + A3}\right\}$$

This equation is similar to equation (6) above. Next, as before, a test weight is placed over each of the load cells in turn and the output or Span for each position recorded. By following the above steps of equations (7) through (11), equation (12) becomes equation (15) as follows:

$$\text{SPAN } 1_N = \text{SPAN } 1_0\left(\frac{(A1)^2}{A1 + A2} + \frac{(A1)^2}{A1 + A4}\right)_N \tag{15}$$

$$\text{SPAN } 2_N = \text{SPAN } 2_0\left(\frac{(A2)^2}{A2 + A3} + \frac{(A2)^2}{A2 + A1}\right)_N$$

$$\text{SPAN } 3_N = \text{SPAN } 3_0\left(\frac{(A3)^2}{A3 + A4} + \frac{(A3)^2}{A3 + A2}\right)_N$$

$$\text{SPAN } 4_N = \text{SPAN } 4_0\left(\frac{(A4)^2}{A4 + A1} + \frac{(A4)^2}{A4 + A3}\right)_N$$

Thus, when a bridge circuit in accordance with FIG. 8 is employed in a scale, the values of the compensating parallel resistors are determined by a series of iterative computations performed in accordance with equations (15) until all of the Spans are substantially equal in the same way as described above with reference to equation (12) where $$S = \frac{AG}{1 - A}$$

The accuracy of the compensation is determined in part by size of the decrement of the A's employed in the iterative computations. In addition, when desired or required additional series of iterative computations may be performed using the results of the previous series as the beginning or Span for the next series of computations.

Figure 9:
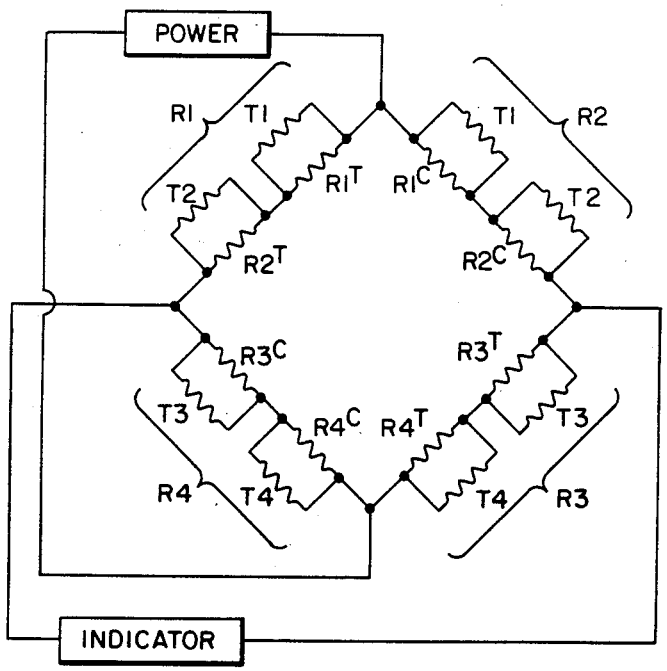
FIG. 9 shows another bridge arrangement similar to the arrangement of FIG. 8 in which the strain gages are connected in a different manner.

FIG. 9 shows a bridge circuit similar to the bridge circuit of FIG. 8 wherein a different compensation pattern is involved. In the arrangement of FIG. 9 the pattern of connections of the strain gages to the bridge is such that greater compensation is required between certain of the load cells than is required between other of the load cells, as, for example, the load cells of a long scale as shown in FIG. 6. For scales incorporating strain gage bridge circuits in accordance with FIG. 9, the values of the compensating resistors are determined in substantially the same manner as described above for the bridge circuit of FIG. 8. After the equations are so determined a test weight is placed over each of the load cells in turn and the results recorded. Then a series of iterative calculations are performed as above to determine the value of the respective A's and then the values of the respective compensating resistors.

Figure 10:
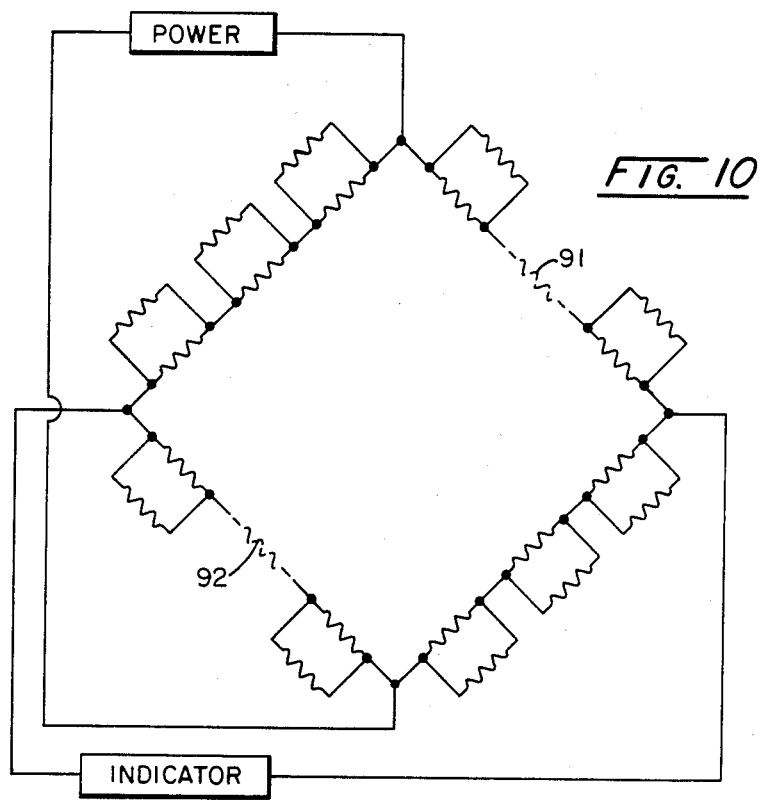
FIG. 10 shows still another bridge arrangement similar to FIGS. 8 and 9 for interconnecting the strain gages of an odd number of load cells.

Bridge circuits similar to FIGS. 8 or 9 may be employed for scales having three or more load cells. For example, FIG. 10 shows a bridge circuit arrange for five load cells. If it is desired to make such a bridge circuit symmetrical, resistors 91 and 92 may be added. While not necessary, such resistors are usually desirable.

Figure 11:
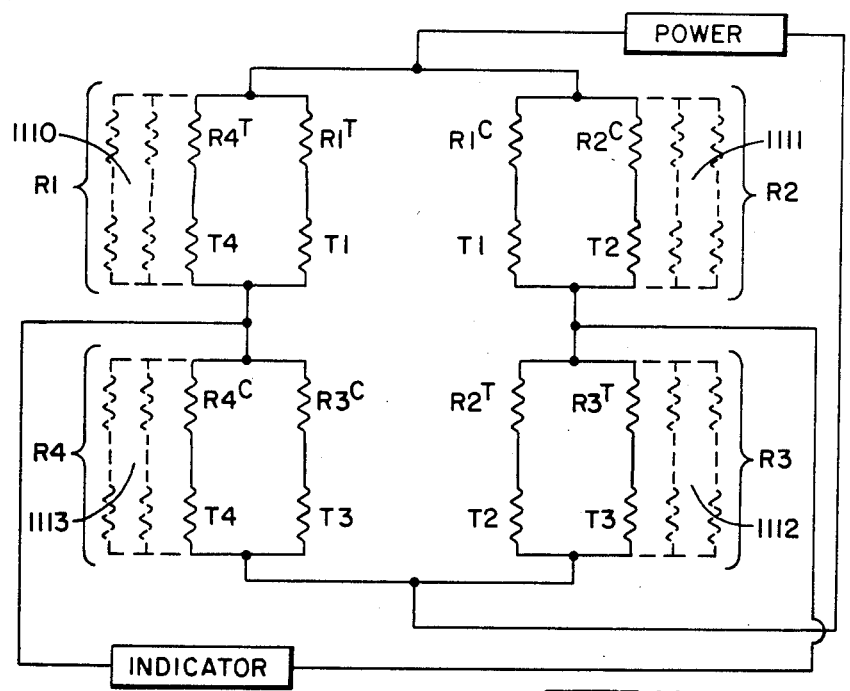
Figure 12:
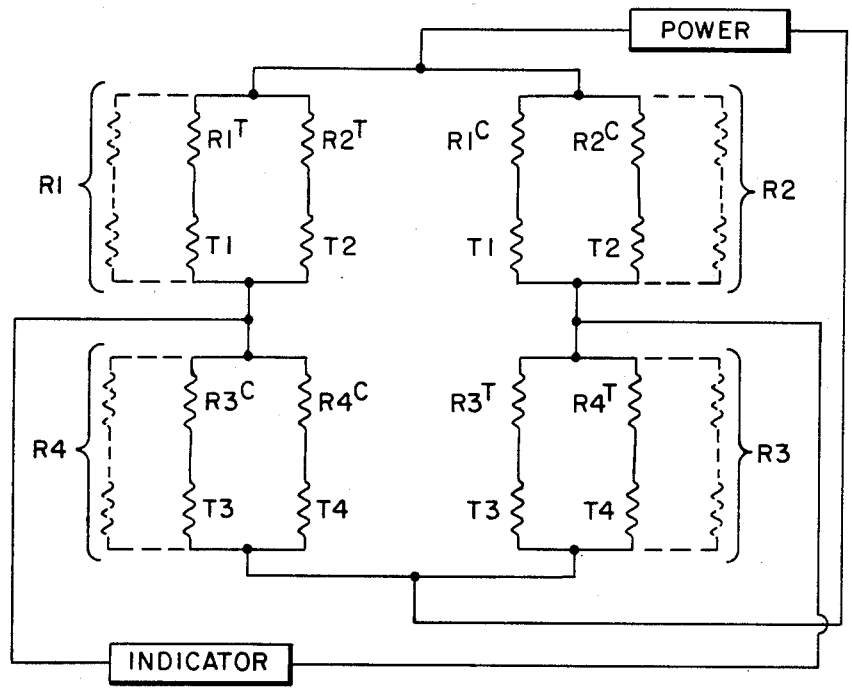
FIG. 12 shows a bridge circuit arrangement in which the compensating resistors are connected in series with the strain gages.

It is sometimes desirable to employ series compensating resistor networks instead of parallel compensating networks. FIG. 11 shows a bridge arrangement wherein the compensating resistor networks are connected in series with the strain gages. This arrangement is also suitable for scale arrangements employing three or more load cells. The arrangements of FIGS. 11 and 12 are arranged for four load cells. However, additional load cell strain gages may be connected in parallel as indicated at 1110, 1111, 1112, and 1113.

For the bridge circuit of FIG. 11, the same general strain gage bridge circuit equation (1) applies and the equations for the bridge arms are as follows.

$$\frac{DE}{V} = \frac{1}{4}\left(\frac{DR1}{R1} - \frac{DR2}{R2} + \frac{DR3}{R3} - \frac{DR4}{R4}\right) \tag{1}$$

From FIG. 11, it can be seen that the expression for the resistance of each arm is, $$R1 = \frac{(R1^T + T1)(R4^T + T4)}{R1^T + T1 + R4^T + T4} \tag{16}$$

$$R2 = \frac{(R1^C + T1)(R2^C + T2)}{R1^C + T1 + R2^C + T2}$$

$$R3 = \frac{(R2^T + T2)(R3^T + T3)}{R2^T + T2 + R3^T + T3}$$

-continued
$$R4 = \frac{(R3^C + T3)(R4^C + T4)}{R3^C + T3 + R4^C + T4}$$

Using the approximations, $R1^T = R1^C = G$; $R2^T = R2^C = G$; etc.:

$$A = R/(R + T) = 1/(1 + T/R), \text{ and } (R + T) = \frac{G}{A} = \quad (17)$$

$$\frac{\left(\frac{G}{A1}\right)\left(\frac{G}{A4}\right)}{\frac{G}{A1} + \frac{G}{A4}} \times \frac{(A1)(A4)}{(A1)(A4)}$$

$$R1 = \frac{G}{A1 + A4} \quad (18)$$

Similarly $$\begin{aligned} R2 &= G/(A1 + A2) \\ R3 &= G/(A2 + A3) \\ R4 &= G/(A3 + A4) \end{aligned} \quad (19)$$

The differential or change in the arm resistance due to weight on the scale is $$DR1 = \frac{DR1^T(R4^T + T4) + DR4^T(R1^T + T1)}{(R1^T + T1 + R4^T + T4)} - \quad (20)$$

$$\frac{(R1^T + T1)(R4^T + T4)(DR1^T + DR4^T)}{(R1^T + T1 + R4^T + T4)^2}$$

$$= \frac{DR1^T \frac{G}{A4} + DR4^T \frac{G}{A1}}{\left(\frac{G}{A1} + \frac{G}{A4}\right)} - \quad (21)$$

$$\frac{\left(\frac{G}{A1}\right)\left(\frac{G}{A4}\right)(DR1^T + DR4^T)}{\left(\frac{G}{A1} + \frac{G}{A4}\right)^2}$$

$$= \frac{\frac{G}{A1A4}(DR1^TA1 + DR4^TA4)}{\frac{G}{A1A4}(A1 + A4)} - \quad (22)$$

$$\frac{\frac{G^2}{A1A4}(DR1^T + DR4^T)}{\frac{G^2}{A1^2A4^2}(A1 + A4)^2}$$

$$= \frac{(DR1^TA1 + DR4^TA4)(A1 + A4)}{(A1 + A4)^2} - \quad (23)$$

$$\frac{A1A4(dR1^T + dR4^T)}{(A1 + A4)^2}$$

$$DR1 = \left[(dR4^T)\frac{(A4)^2}{(A1 + A4)^2} + (dR1^T)\frac{(A1)^2}{(A1 + A4)^2}\right]$$

Similarly $$DR2 = \left[(dR1^C)\frac{(A1)^2}{(A1 + A2)^2} + (dR2^C)\frac{(A2)^2}{(A1 + A2)^2}\right] \quad (24)$$

-continued $$DR3 = \left[(dR2^T)\frac{(A2)^2}{(A2 + A3)^2} + (dR3^T)\frac{(A3)^2}{(A2 + A3)^2}\right]$$

$$DR4 = \left[(dR3^C)\frac{(A3)^2}{(A3 + A4)^2} + (dR4^C)\frac{(A4)^2}{(A3 + A4)^2}\right]$$

Dividing DR by R $$\frac{DR1}{R1} = \frac{1}{G}\left(\frac{DR1^T(A1)^2}{A1 + A4} + \frac{DR4^T(A4)^2}{A1 + A4}\right) \quad (25)$$

$$\frac{DR2}{R2} = \frac{1}{G}\left(\frac{DR1^C(A1)^2}{A1 + A2} + \frac{DR2^C(A2)^2}{A1 + A2}\right)$$

$$\frac{DR3}{R3} = \frac{1}{G}\left(\frac{DR2^T(A2)^2}{A2 + A3} + \frac{DR3^T(A3)^2}{A2 + A3}\right)$$

$$\frac{DR4}{R4} = \frac{1}{G}\left(\frac{DR3^C(A3)^2}{A3 + A4} + \frac{DR4^C(A4)^2}{A3 + A4}\right)$$

Thus, the bridge output is $$\frac{DE}{V} = \frac{1}{4G}\left[DR1\left(\frac{(A1)^2}{A1 + A2} + \frac{(A1)^2}{A4 + A1}\right) + \right. \quad (26)$$

$$DR2\left(\frac{(A2)^2}{A2 + A3} + \frac{(A2)^2}{A1 + A2}\right) +$$

$$DR3\left(\frac{(A3)^2}{A3 + A4} + \frac{(A3)^2}{A2 + A3}\right) +$$

$$\left. DR4\left(\frac{(A4)^2}{A4 + A1} + \frac{(A4)^2}{A3 + A4}\right)\right]$$

This equation is similar to equations (6) and (14) above. Next, a test weight is placed over each of the load cells in turn and the output or span for each position recorded. Then, by following the above steps of the equations (7) through (11), equation (12) becomes equation (24) as follows:

$$\text{SPAN } 1_N = \text{SPAN } 1_0\left(\frac{(A1)^2}{A1 + A2} + \frac{(A1)^2}{A4 + A1}\right)_N \quad (27)$$

$$\text{SPAN } 2_N = \text{SPAN } 2_0\left(\frac{(A2)^2}{A2 + A3} + \frac{(A2)^2}{A1 + A2}\right)_N$$

$$\text{SPAN } 3_N = \text{SPAN } 3_0\left(\frac{(A3)^2}{A3 + A4} + \frac{(A3)^2}{A2 + A3}\right)_N$$

$$\text{SPAN } 4_N = \text{SPAN } 4_0\left(\frac{(A4)^2}{A4 + A1} + \frac{(A4)^2}{A3 + A4}\right)_N$$

Thus, when a bridge circuit in accordance with FIG. 11 is employed in a scale, the values of the compensating series resistors are determined by a series of iterative computations performed in accordance with equations

(27) until all of the Spans are substantially equal in the same way as described above with reference to equations (12) and (15). The values of the compensating resistors can be calculated from the resulting A's from the following equation $$T = \frac{R(1 - A)}{A}$$

The accuracy of the compensation is determined in part by size of the decrement of the A's employed in the iterative computations. In addition, when desired or required additional series of iterative computations may be performed using the results of the previous series as the beginning or Span for the next series of computations.

FIG. 12 shows a bridge circuit similar to the bridge circuit of FIG. 11 wherein a different compensating pattern is involved. In the arrangement of FIG. 12 the pattern of connections of the strain gages to the bridge is such that greater compensation is required between certain of the load cells than is required between other of the load cells, as, for example, the load cells of a long scale as shown in FIG. 6.

For scales incorporating strain gage bridge circuits in accordance with FIG. 12, the values of the compensating resistors are determined in substantially the same manner as described above for the bridge circuit of FIG. 11. After the equations are so determined, a test weight is placed over each of the load cells in turn and the results recorded. Then a series of iterative calculations are performed as above to determine values of the respective A's and then the values of the compensating resistors.

Figure 13:
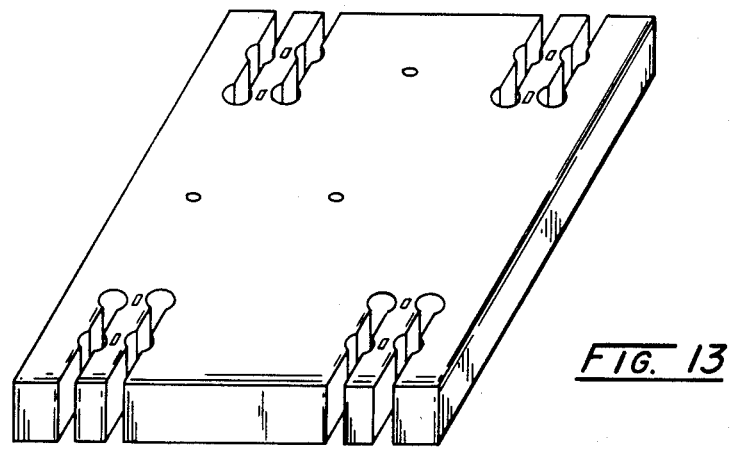
FIG. 13 shows a gage plate arrangement of the scale platform which may be compensated in accordance with the present invention.

FIG. 13 shows a gage plate scale arrangement (see U.S. Pat. No. 4,261,429) which may be compensated in a manner similar to the compensations of the scale arrangements shown in FIGS. 1 through 6. Here the load cells are integral with the scale platform and are formed between two slots cut in the platform near the corners. The free ends of the load cells support the scale platform. The strain gages are mounted on the load cells and may be connected in any one of the electrical bridge circuits of FIGS. 7 through 12 and compensated in the manners described above.

What is claimed is:

1. Weighing apparatus comprising a load receiving platform, N load cells supporting said platform, where N is at least four, each of said load cells having only two strain gages mounted thereon, said strain gages being connected in at least one electrical bridge circuit to provide a signal indicative of the magnitude of a load on the platform and compensating resistors connected in circuit with at least one strain gage of at least N−1 of the load cells to make the output of the bridge circuit substantially independent of the location of a load on the platform.

2. Weighing apparatus as claimed in claim 1 and wherein the gages of each arm of the bridge circuit are in series, the respective gages of each load cell are positioned adjacent each other in different arms of the bridge, and a compensating resistor is connected across the combination of adjacent gages of three of the load cells.

3. Weighing apparatus as claimed in claim 1 wherein the compensating resistors are connected in series with the gages.

4. Weighing apparatus as claimed in claim 1 wherein the compensating resistors are connected in parallel with the gages.

5. Weighing apparatus as claimed in claim 1 wherein said load cells are beams constructed as integral parts of said platform, each beam having a free end and a fixed end merging into said platform.

6. Weighing apparatus as claimed in claim 1 wherein each load cell has a strain gage subject to tension and a strain gage subject to compression, corresponding gages from each of N/2 load cells connected in one arm of the bridge circuit and the other gage from each of the same N/2 load cells connected in the same adjacent arm of the bridge circuit.

7. Weighing apparatus as claimed in claim 1 wherein N is equal to four.

8. A method of compensating a scale having at least three load cells and no more than two strain gages per load cell, comprising the steps of arranging the strain gages of the load cells in a bridge circuit to provide an output signal representative of a load on the scale, placing a load on the scale sequentially in a number of locations and obtaining a load indication for each of said locations, utilizing said load indications to calculate the values of compensating resistors required to be connected in circuit with certain of the strain gages to render the output of said bridge circuit substantially independent of the location of a load on the scale, and connecting said compensating resistors in circuit with the appropriate strain gages to render the output of said bridge circuit substantially independent of the location of a load on the scale.

9. A method as claimed in claim 8 for compensating a scale having no more than four load cells, including the steps of arranging the gages of each arm of the bridge circuit in series, arranging the respective gages of each load cell adjacent each other in different arms of the bridge, and connecting a compensating resistor across the combination of adjacent gages of some of the load cells.

10. A method as claimed in claim 8 including the step of connecting compensating resistors in series with the appropriate gages.

11. A method as claimed in claim 8 including the step of connecting compensating resistors in parallel with the appropriate gages.

12. A method as claimed in claim 8 for compensating N load cells each having a strain gage subject to tension and a strain gage subject to compression, including the steps of connecting corresponding gages from each of N/2 load cells in one arm of the bridge circuit and connecting the other gage from each of the same N/2 load cells in the same adjacent arm of the bridge circuit.

13. A method as claimed in claim 8 wherein said scale has four load cells and said load indications are utilized to calculate the values of compensating resistors required to be connected in circuit with at least one of the strain gages of each of at least three of the load cells to render the output of said bridge circuit substantially independent of the location of a load on the scale.

14. A method of compensating a scale having N load cells, where N is at least 4, and no more than two strain gages per load cell, comprising the steps of arranging the strain gages of the load cells in a bridge circuit to provide an output signal representative of a load on the scale, placing a load on the scale sequentially in a number of locations and obtaining a load indication for each of said locations, utilizing said load indications to determine the values of compensating resistors required to be connected in circuit with at least one strain gage of at least N−1 of the load cells to render the output of said bridge circuit substantially independent of the location of a load on the scale, and connecting said compensating resistors in circuit with the appropriate strain gages to render the output of said bridge circuit substantially independent of the location of a load on the scale.

15. A method as claimed in claim 14 wherein the values of the compensating resistors are determined by calculation.

16. The method of compensating scales having a platform supported by at least three load cells connected in an electrical bridge circuit, which method comprises the steps of (1) determining the response of each load cell by placing a test weight over each load cell, (2) calculating attenuated responses for the respective load cells in small decrements until the responses of the respective load cells are all substantially equal, and (3) calculating from said responses the magnitudes of compensating resistors to be connected to the respective load cells so that the response of the scale is substantially independent of the position of the load on the platform.

17. The method of compensating scales in accordance with claim 16 including repeating the steps of the method of claim 16.

18. A scale arrangement comprising in combination a scale platform, a plurality of at least four load cells supporting the platform, each load cell having a single strain gage responsive to tension and a single strain gage responsive to compression, an electrical bridge circuit comprising the strain gages of each load cell connected in adjacent arms of the bridge circuit, and a single resistor connected to both of the strain gages of at least three of the load cells so that the output of the bridge circuit is substantially independent of the position of a load on the platform.

19. A scale arrangement comprising in combination a scale platform, a plurality of at least four load cells supporting the platform, each load cell having a single strain gage responsive to tension and a single strain gage responsive to compression, an electrical bridge circuit comprising the strain gages of each load cell connected in adjacent arms of the bridge circuit, and a resistor connected between intermediate points of at least three pairs of adjacent arms of the bridge circuit so that the output of the bridge circuit is substantially independent of the position of a weight on the scale platform.

20. Weighing apparatus as claimed in claim 28 wherein said compensating resistors are connected in circuit with individual strain gages to modify the response of the respective individual strain gage.

21. A method as claimed in claim 8 including the step of utilizing the load indications in calculating the values of compensating resistors required to be connected in circuit with certain individual strain gages to render the output of the bridge circuit substantially independent of the location of a load on the scale.

22. A method of compensating a scale having a platform supported by at least three load cells connected in an electrical bridge circuit, comprising the steps of determining the responses of at least some of the load cells by placing a test weight over each of those load cells in sequence and reading the outputs of the bridge circuit, calculating attenuated responses for those load cells in small decrements until the differences in the responses of the load cells are minimized within desired limits, and calculating from said responses the magnitudes of compensating resistors to be connected to at least some of those load cells so that changes in the response of the scale with changes in the position of the load on the platform are reduced.

* * * * *